US008644677B2

(12) United States Patent
Zalewski

(10) Patent No.: US 8,644,677 B2
(45) Date of Patent: Feb. 4, 2014

(54) NETWORK MEDIA PLAYER HAVING A USER-GENERATED PLAYBACK CONTROL RECORD

(75) Inventor: Gary Zalewski, Oakland, CA (US)

(73) Assignee: Sony Computer Entertainment America LLC, Redwood City, CA (US)

( * ) Notice: Subject to any disclaimer, the term of this patent is extended or adjusted under 35 U.S.C. 154(b) by 424 days.

(21) Appl. No.: 12/631,108

(22) Filed: Dec. 4, 2009

(65) Prior Publication Data

US 2010/0080533 A1  Apr. 1, 2010

Related U.S. Application Data

(63) Continuation-in-part of application No. 11/679,059, filed on Feb. 26, 2007.

(51) Int. Cl.
*H04N 9/80* (2006.01)
(52) U.S. Cl.
USPC .......................................... 386/248; 386/343
(58) Field of Classification Search
USPC ............. 725/46; 386/248, 278, 296, 299, 343
See application file for complete search history.

(56) References Cited

U.S. PATENT DOCUMENTS

| | | | | | |
|---|---|---|---|---|---|
| 3,627,914 | A | * | 12/1971 | Davies | 348/722 |
| 4,425,581 | A | | 1/1984 | Schweppe et al. | |
| 4,979,057 | A | * | 12/1990 | Matsumoto et al. | 360/71 |
| 5,182,640 | A | * | 1/1993 | Takano | 348/722 |
| 5,197,047 | A | * | 3/1993 | Witheridge et al. | 369/4 |
| 5,283,639 | A | * | 2/1994 | Esch et al. | 725/32 |
| 5,410,344 | A | * | 4/1995 | Graves et al. | 725/46 |
| 5,418,622 | A | * | 5/1995 | Takeuchi | 386/241 |
| 5,488,433 | A | * | 1/1996 | Washino et al. | 348/722 |
| 5,903,702 | A | * | 5/1999 | Sugiyama et al. | 386/278 |
| 6,339,453 | B1 | | 1/2002 | Chen et al. | |
| 6,362,856 | B1 | * | 3/2002 | Guzik et al. | 348/722 |
| 6,781,638 | B1 | | 8/2004 | Hayes | |
| 6,868,440 | B1 | * | 3/2005 | Gupta et al. | 709/219 |
| 6,947,935 | B1 | * | 9/2005 | Horvitz et al. | 1/1 |
| 6,952,576 | B2 | | 10/2005 | Fish et al. | |
| 6,963,612 | B2 | | 11/2005 | Haddad | |
| 7,006,881 | B1 | | 2/2006 | Hoffberg et al. | |
| 7,260,823 | B2 | | 8/2007 | Schlack et al. | |
| 7,509,178 | B2 | | 3/2009 | Logan et al. | |
| 7,631,330 | B1 | | 12/2009 | Des Jardins | |

(Continued)

FOREIGN PATENT DOCUMENTS

| | | | |
|---|---|---|---|
| JP | 2004-199742 | * | 7/2004 |
| JP | 2005051681 | | 2/2005 |
| JP | 2005260748 | | 9/2005 |
| WO | WO0167756 | | 9/2001 |

*Primary Examiner* — David Harvey
(74) *Attorney, Agent, or Firm* — Steptoe & Johnson LLP

(57) ABSTRACT

A network media player enables user-controlled playback of video or other content from various sources according to a playback control record. The network media player includes a content input port, an output port, and a processor configured to retrieve input content from one or more sources using the content input port. The processor is also configured to generate output content from the retrieved input content according to a playback control record so as to vary the playback of the retrieved input content. The processor is also configured to output the generated output content to the output port. In some embodiments, the playback control record includes an applicability identifier usable to determine whether the playback control record is applicable to input content and a content variation descriptor that defines an alteration to be applied to the retrieved input content.

11 Claims, 12 Drawing Sheets

(56) References Cited

U.S. PATENT DOCUMENTS

| | | |
|---|---|---|
| 7,698,236 B2 | 4/2010 | Cox et al. |
| 7,721,310 B2 * | 5/2010 | Schaffer et al. ............... 725/46 |
| 7,756,388 B2 | 7/2010 | Plastina et al. |
| 7,770,137 B2 | 8/2010 | Forbes et al. |
| 8,046,798 B1 * | 10/2011 | Schlack et al. ............... 725/46 |
| 8,069,466 B2 | 11/2011 | Shelton et al. |
| 8,091,111 B2 * | 1/2012 | Logan et al. ............... 725/110 |
| 8,095,950 B1 | 1/2012 | Lapcevic |
| 8,116,616 B2 | 2/2012 | Plotnick et al. |
| 8,311,401 B2 * | 11/2012 | Park et al. ............... 386/360 |
| 8,321,466 B2 | 11/2012 | Black et al. |
| 2001/0018769 A1 * | 8/2001 | Matsui ............... 725/87 |
| 2002/0083469 A1 | 6/2002 | Jeannin et al. |
| 2002/0116708 A1 | 8/2002 | Morris et al. |
| 2002/0144262 A1 | 10/2002 | Plotnick et al. |
| 2003/0001880 A1 | 1/2003 | Holtz et al. |
| 2003/0014768 A1 | 1/2003 | Ishihara et al. |
| 2003/0093790 A1 * | 5/2003 | Logan et al. ............... 725/38 |
| 2003/0215209 A1 | 11/2003 | Kawaguchi |
| 2004/0012717 A1 | 1/2004 | Sprague et al. |
| 2004/0073924 A1 | 4/2004 | Pendakur |
| 2004/0117819 A1 | 6/2004 | Yu |
| 2004/0268384 A1 | 12/2004 | Stone |
| 2005/0025249 A1 | 2/2005 | Zhao et al. |
| 2005/0025959 A1 | 2/2005 | Bellman |
| 2005/0060229 A1 | 3/2005 | Riedl et al. |
| 2005/0088333 A1 * | 4/2005 | Allport ............... 341/176 |
| 2005/0102695 A1 * | 5/2005 | Musser, Jr. ............... 725/34 |
| 2005/0132295 A1 | 6/2005 | Noll et al. |
| 2005/0204385 A1 | 9/2005 | Sull et al. |
| 2005/0210502 A1 | 9/2005 | Flickinger et al. |
| 2005/0283796 A1 | 12/2005 | Flickinger |
| 2006/0059535 A1 * | 3/2006 | D'Avello ............... 725/139 |
| 2006/0143236 A1 | 6/2006 | Wu |
| 2006/0280437 A1 | 12/2006 | Logan et al. |
| 2007/0041707 A1 | 2/2007 | Edmunds et al. |
| 2007/0156739 A1 | 7/2007 | Black et al. |
| 2007/0206949 A1 | 9/2007 | Mortensen |
| 2007/0260677 A1 | 11/2007 | DeMarco et al. |
| 2008/0040740 A1 | 2/2008 | Plotnick et al. |
| 2008/0060001 A1 | 3/2008 | Logan et al. |
| 2008/0118062 A1 | 5/2008 | Radivojevic et al. |
| 2008/0152300 A1 | 6/2008 | Knee et al. |
| 2008/0155589 A1 | 6/2008 | McKinnon et al. |
| 2008/0259222 A1 | 10/2008 | Hardacker et al. |
| 2008/0307454 A1 | 12/2008 | Ahanger et al. |
| 2009/0093278 A1 | 4/2009 | Negron et al. |
| 2009/0132924 A1 * | 5/2009 | Vasa et al. ............... 715/723 |
| 2010/0103324 A1 * | 4/2010 | Maegawa ............... 348/705 |
| 2010/0125882 A1 | 5/2010 | Athias |
| 2010/0150330 A1 | 6/2010 | Perry et al. |
| 2011/0173655 A1 | 7/2011 | Blumenschein et al. |

\* cited by examiner

NETWORK MEDIA PLAYER HAVING A USER-GENERATED PLAYBACK CONTROL RECORD

CROSS-REFERENCE TO RELATED APPLICATIONS

This application is a continuation-in-part of U.S. patent application Ser. No. 11/679,059 filed Feb. 26, 2007, entitled "Variation and Control of Sensory Work Playback," which is hereby incorporated by reference. This application is related to co-pending U.S. patent application Ser. No. 12/631,132 concurrently filed on Dec. 4, 2009, entitled "Social Network-Driven Media Player System And Method;" co-pending U.S. patent application Ser. No. 12/631,158 concurrently filed on Dec. 4, 2009, entitled "Network Media Player And Overlay Feature;" and co-pending U.S. patent application Ser. No. 12/631,171 concurrently filed on Dec. 4, 2009 entitled "Media Player With Networked Playback Control And Advertisement Insertion."

TECHNICAL FIELD

Briefly, and in general terms, this disclosure relates to systems and methods for user-generated playback control in network media players.

BACKGROUND

Personal Video Recorders (PVRs) have revolutionized the way many consumers watch television. Similar to a video cassette recorder (VCR), a PVR allows a user to record shows for viewing at a later time; however, PVRs offer many additional features including the ability to pause and rewind a live television broadcast.

With many cable companies and satellite providers offering over 100 channels of programming, it can be a daunting task to find the programming that a subscriber would like to watch. Many PVRs offer ways to manage or reduce complexity. For example, a PVR may allow subscribers to record shows by title whenever they are shown so that a subscriber does not need to be concerned when a favorite program moves from Monday night to Thursday night. Some PVRs allow programs to be recorded by categories and/or keywords. For example, this allows someone interested in remodeling a bathroom to record home improvement television programs with "bathroom" in their title description.

PVRs reduce the complexity and improve the ability to record shows that a subscriber desires to watch; however, PVR functionality stops there. Once a subscriber has recorded shows, they can be played back, paused, fast forwarded, rewound, and the like; however, the viewer typically manually controls this functionality.

Television programs are recorded on PVRs (and otherwise) by individuals with different tastes, preferences, purposes, and the like For example, one person may record the Super Bowl to watch football, while another may record it to watch the pre-game and half-time programming, and another may record it to watch new commercials. Each of these individuals, using a conventional PVR would desire to playback the show in a different manner.

It is desirable to provide a mechanism to create, use, and/or share different playbacks of television programs and other sensory works. For example, it is desirable to provide an individual who has recorded the Super Bowl only to watch the commercials with the ability to playback his recording of the Super Bowl on his PVR such that only the commercials are shown. Similarly, an individual who has recorded the Super Bowl only for the football may desire to only see each football play during playback.

This disclosure discusses techniques and systems that may be used to create metadata or the like that controls or varies the playback of a sensory work, such as, a television program.

SUMMARY

In one general aspect, a method for user-generated content control in a network media player includes retrieving input content from one or more sources, generating output content from the retrieved input content from the one or more sources according to a playback control record so as to vary the playback of the retrieved input content, and outputting the generated output content.

The details of one or more implementations are set forth in the accompanying drawings and the description below. Other features and advantages will be apparent from the description and drawings, and from the claims.

DETAILED DESCRIPTION

Figure 1:
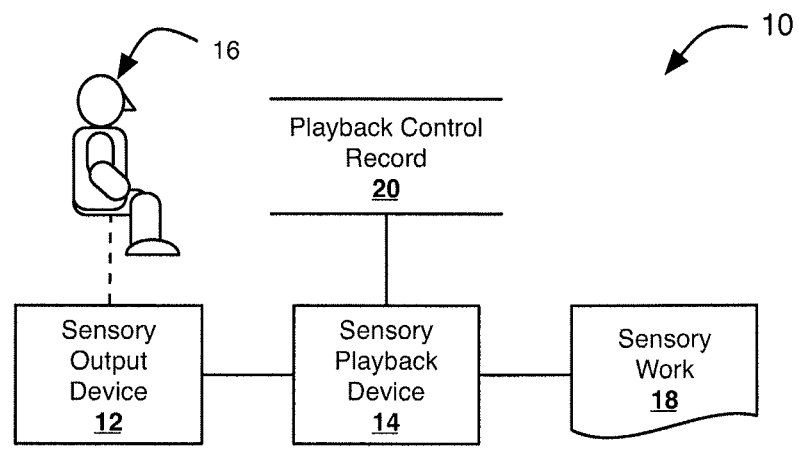
FIG. 1 is a diagram of a sensory work playback system.

Referring to FIG. 1, a sensory work playback system 10 includes at least one sensory work output device 12 coupled to a sensory playback device 14 such that the sensory output device 12 is operable to stimulate at least one of a stimulatory experient's 16 senses by varying the playback of a sensory work 18 based on a playback control record 20. For purposes of this disclosure, a stimulatory experient 16 is one whose senses are stimulated by a sensory output device 12. The sensory playback device 14 is operable to control or vary the playback of the sensory work 18 based on a playback control record 20.

A sensory work output device 12 is any apparatus operable to stimulate at least one sense of a stimulatory experient 16, whether by electrical, mechanical, chemical, thermal, and/or biological mechanisms. By way of example, and not by way of limitation, sensory work output devices 12 include the following and the like: video display devices, such as televisions, monitors, display panels, whether standalone or embedded (e.g., a mobile telephone display, a portable DVD player, or a handheld video game unit); audio devices, such as speakers, headsets, and earphones; and tactile devices, such as virtual reality gloves, automated massage chairs, computer-controlled exercise equipment, simulators (e.g., flight simulators, firearm training simulators, driving simulators, and the like), and haptic devices (e.g., video game controllers). One skilled in the art will appreciate that the devices, systems, and techniques described herein are widely applicable to existing and future sensory work output technologies.

A sensory playback device 14 is any device operable to control a sensory work output device 12. By way of example, and not by way of limitation, sensory playback device 14 may be embodied as a digital video recorder (DVR), video cassette recorder, digital entertainment center, cable box, computer, radio (either terrestrial or satellite), cassette player, digital music player, CD player, DVD player, Blu-ray Disc player, automated massage chair, electronically controlled exercise devices, personal digital assistants (PDAs), digital book viewing devices, and the like.

The most common sensory works 18 in use today include audio recordings and motion pictures. However, as used herein, sensory work 18 refers to any work fixed in a tangible form of expression usable by sensory playback device 14 to stimulate at least one sense of a stimulatory experient 16, whether by electrical, mechanical, chemical, thermal, and/or biological mechanisms. It should be stated that any work "fixed" in tangible form may include dynamic content and blog material. Such material may be considered "fixed" with respect to the state and/or the content of the video blog at any instant of time; however, the inventor recognizes that the present invention may be used to control playback of such dynamic community content, including video or blog content.

The following sensory works 18, provided for purposes of explanation, are not intended to be limiting:

1. Motion Pictures and Television Programs. Audiovisual works such as movies and television shows may be obtained from many sources. For example, they may be purchased or rented on Blu-ray Discs, DVDs, video tapes, Universal Media Discs (UMDs), and the like. In addition, they may be watched or recorded from cable, satellite, or over-the-air broadcasts, and stored for later playback. Also, they may be streamed or downloaded over a data network.

2. Music and Audio Books. Audio recordings of music and audio books are commonly available for purchase on tapes, CDs, DVDs, UMDs, Blu-ray Discs, and the like. Additionally, music and audio books may be streamed or downloaded using a data network. Finally, music and audio programming is commonly broadcast by radio stations, satellite radio companies, and by various entities on the Internet. Audio data may be stored in a wide variety of formats, such as, for example, Audio CD format, MPEG-1 Audio Layer 3 (MP3) format, Advanced Audio Coding (AAC) format, and the like.

3. iFIT Workouts. Certain exercise equipment, such as treadmills, exercise bikes, elliptical trainers, and the like have been enabled to receive signals from data cartridges, videotapes, audio recordings, DVDs, and the like to vary aspects of a workout. For example, an iFIT videotape can be used to control a treadmill—during an exercise session, such that a user views a video of a path through a scenic locale, and the speed, and level of incline are varied as the video is played.

4. Digital Books. Books may now be purchased entirely in electronic format for use on a computer, personal digital assistant (PDA), or an electronic device designed for this purpose. Images of pages in the digital book are displayed such that a reader may read just as with a conventional printed book, with certain added abilities to search, bookmark, annotate, and the like.

5. Internet. The Internet provides a source of a wide-variety of static and dynamic data. It may be desirable to vary a user's interaction with Internet websites and downloaded data based on defined metadata.

6. Network Media Players. Devices are available that consumers may use to playback certain media. For example, a network media player may be used to receive content across a data network from local and/or remote destinations, and playback the received media. For example, a network media player may be used to retrieve any media including digital audio content (such as, for example, music, audio books, podcasts, and the like), video content (such as, for example, movies, television programs, music videos, and the like) from a home media server and playback that content.

7. Emerging and New Formats & Technologies. Various new electrical and/or mechanical devices that now support or could foreseeably support the playback of sensory works 18 have emerged. For example, amusement rides, robotic massage chairs, laser light show devices, electronically-controlled holiday lighting, video game systems, simulators, and the like.

One skilled in the art will appreciate that the systems and techniques described herein are applicable to any sensory work 18 including those that stimulate one's senses of sight, smell, taste, touch, or hearing, and any combination thereof.

Playback Control Records

Playback control records 20 include various data usable by a sensory playback device 14 to vary or control the playback of a sensory work 18. One skilled in the art will appreciate that playback control records 20 may be represented and stored using any conventional data storage and data access techniques. For example, one implementation of a sensory work playback system 10 uses playback control records 20 remotely stored on a server in XML format and transmitted to a sensory playback device 14 as necessary to vary or control the playback of a sensory work 18. Playback control records 20 may include one or more of the following elements: playback variation & control operations; identification of a sensory work 18; and/or a frame of reference. Also, playback control records 20 may include whatever additional information may be desired for a particular embodiment. For example, some embodiments use playback control records 20 having a title, an author, a creation date, and the like.

Playback Variation & Control Operations

This section discusses the various operations that may be applied to vary or control the playback of a sensory work 18.

Deletion

It may be desirable to delete or skip certain segments of a sensory work 18. For example, some viewers of a movie or television program may desire to skip commercials and/or unwanted content for a wide variety of reasons, including a desire to remove content believed to be harmful, inappropriate, or otherwise undesirable; to remove content immaterial or unimportant for a particular viewer's purposes or uses; or to remove content of a lesser priority.

Consider, for example, a viewer who records the television program "Survivor" on his or her PVR. If the viewer is able to watch the program every week, he or she may desire to see the entire program (except for the commercials); however, if the viewer misses a couple of programs, he may be less interested in seeing the entire program for all but the most recent showing and simply catch the highlights, such that they can watch the most recent broadcast in full. Based on the particular viewer's needs and/or purposes, different portions of the broadcast would be desirable to skip over or be deleted during playback.

For another example, consider a user who has recorded the Academy Awards, a broadcast that attracts the interest of many different groups of viewers. Viewers recording this event may be interested in celebrities; entertainment news; movies; a particular actor, actress, screenwriter, director, and/or movie; musical entertainment; and the like. Different groups of viewers may prefer to watch different portions of the broadcast. Thus, it is desirable to delete or skip portions of the broadcast to provide a custom viewing experience for each group.

Reordering

In some instances, it may be desirable to view or experience certain segments of a sensory work 18 in a different order than that intended by the broadcaster, producer, and/or author.

For example, when listening to music, groups of listeners may wish to play music tracks in a different order than they appear on an album. It is desirable to reorder the playback of segment of a sensory work 18.

Overlaying

In some instances, it may be desirable to overlay information during the playback of a sensory work 18.

For example, if a website providing metadata or the like to vary the playback and/or control of a television program publishes such information such that users may access the metadata to collapse or delete content that they do not wish to see, that website may wish to insert advertising data by overlaying a mark, brand, or other identifier during playback.

Additionally, it may be desirable to insert custom screen tickers, product placements, subtitles, dubbing, images, and the like during playback for a wide variety of reasons.

Playback Speed

In some instances, it may be desirable to vary the playback speed of certain segments of a sensory work 18.

For example, advertisers have found that many PVR users fast-forward through commercials. Some innovative advertisers have incorporated 1-second segments within broadcasts that are effectively only usable by PVR users who pause playback to view the content. It may be desirable to vary playback such that portions of a broadcast are shown paused for a few seconds, shown in slow motion, or shown in fast forward motion, depending on the circumstances.

Additionally, it may be useful to be able to create custom "instant replays" during the playback of a sporting event (or any other program). This would allow, for example, a user to create metadata such that a certain play in a football game would be viewed in slow motion.

Insertion

In some instances, it may be desirable to insert additional information, video, audio, and the like, during the playback of a sensory work 18.

For example, a user may desire to insert media from another source, from another segment within the same source, or to insert new data. One implementation of this technique would be to insert profile-based advertising during playback. For example, during the playback of the Super Bowl, viewers may be shown advertisements based on demographics or any other information available. Thus, viewers living within one census block group may be shown a Lexus advertisement, while those in another census block group may be shown a Toyota advertisement.

Additionally, this technique may be used to add information to a program to create a new program commenting on it, or to otherwise create a derivative work. For example, playback of a broadcast of the State of the Union may be modified by inserting commentary or additional footage. Additionally, playback may be modified for satirical or comedic purposes.

Presentation

In some instances, it may be desirable to modify the presentation of the sensory work 18. For example, one viewer may choose to present a colorized movie in the original black and white version or vice versa. Similarly, other aspects of the display and presentation are allowed to suit the viewer's preferences.

Other

The implementations discussed above are provided for purposes of example only. One skilled in the art will appreciate that any variations, modifications, and/or control of the playback of a sensory work 18 is within the scope of this disclosure.

Metadata

Any modification to a sensory work 18, such as those variations and/or controls mentioned above, may be stored or conceptualized as metadata or other similar control data related to a particular sensory work 18. Metadata as used herein means any control signal or data capable of performing the desired function.

Identification of Sensory Work

Metadata affecting the playback variation and/or control of a sensory work 18 would preferably be associated with a particular sensory work 18 and/or a particular instance of a sensory work 18. For example, a television program broadcast on NBC-affiliate WRC-TV in Washington, D.C. may show different advertisements than NBC-affiliate KNTV in San Francisco. Additionally, a show may be broadcast in different formats, such as Standard Definition (SD) and High-Definition (HD). It is desirable to associate metadata with sensory works 18 to which the metadata is applicable.

In one implementation, metadata includes a program identifier. For example, the program identifier may be "Super Bowl XL". This technique may be suitable for most purposes; however, when there are variations between sources, it may be more desirable to provide separate identifiers for each source (e.g., "Super Bowl XL:DirecTV", "SuperBowl XL:Comcast", "SuperBowl XL:WRC-TV", and the like).

In an implementation applying metadata to a movie, the movie may be available to a viewer who records the movie from broadcast television, from pay-per-view, who plays the movie from DVD, or who obtains the movie across the Internet through a video-on-demand system. Because there may be variations between each broadcast (i.e., some may be edited to fit the screen, some may be shown in widescreen, some may have commercials, and the like), it may be useful to provide an identification of the movie that takes these differences into account.

One possible solution to this problem is to provide a hierarchical representation. For example, there may be a broad class entitled "Super Bowl XL" with more specific instances for different sources. This solution would allow someone who has obtained video from any source to use the broadest class and to use a more specific instance of metadata when available.

Sometimes, a sensory work 18 may be provided with metadata to control playback. When the relationship between metadata and a particular sensory work is implicit, there is no need for any reference to applicable sensory works 18.

Frame of Reference

Once a user has a sensory work 18 and metadata to control or vary playback, it is useful to determine a common frame of reference. When sensory works 18 are identical or substantially identical, a frame of reference may be implicit; however, when there are substantial variations between sensory work 18 sources, it may be useful to provide some synchronization such that the appropriate information is deleted, inserted, reordered, fast forwarded, or otherwise modified or controlled.

There are at least two kinds of sensory works 18: (i) those that are temporally well-behaved; and (ii) those that are not. A sensory work 18 is temporally well-behaved if each playback is relatively coincident in time. For example, movies and audio recordings are temporally well-behaved because the occurrence of each video and/or audio frame is at substantially the same relative moment during playback (i.e., the same note is played at approximately the same relative point in time).

For temporally well-behaved sensory works 18, a frame of reference may be created in time by identifying epoch time $t_0$ and associating this time with the playback of the sensory work 18. The kind of association used will depend on the nature of the sensory work 18. For example, for an audio sensory work 18, the frame of reference may be a waveform, such that a sensory playback device 14 may identify the waveform during playback and, and thus associate epoch time $t_0$ with the matched waveform.

In some instances, matching a single frame may be insufficient because that frame, or one substantially similar, may occur over and over. There are many techniques known in the art for identifying video and/or audio recordings. For example, various video fingerprinting technologies could be employed to identify characteristics of a sensory work 18 that are statistically improbable to occur elsewhere. Such a characteristic may be used to define the epoch time $t_0$ either directly or as an offset to the reference characteristic.

Once a common frame of reference is established, variations and control operations defined by a playback control record 20 may be applied at a defined instance relative to epoch time $t_0$.

Some sensory works 18 are not temporally well-behaved, for example, playback may not be deterministic, playback may vary, or playback may be affected by various external influences. For such a sensory work 18, a playback control record 20 may define variation and control operations relative to events. For example, a playback control record 20 may be created to modify or vary a video game sensory work 18. Because video game play is highly dependent on user interactions, it may be more effective to define variation and control operations based on the occurrence of one or more events instead of the lapse of a predetermined amount of time.

One way to determine a common frame of reference is to set an arbitrary or best guess initial frame of reference and to allow the viewer or user to fine tune playback to account for any differences. For example, it may be assumed that the metadata references an identical copy of the sensory work 18. If insertions, deletions, and the like are being made at inappropriate times, the user may vary playback (such as, for example, by slowing or speeding playback relative to the metadata control, or by skipping frames forwards or backwards relative to the metadata control) to achieve the desired results.

Variation Encoding

One skilled in the art will appreciate that there are countless ways to encode such variations and control of the playback of a sensory work 18. In a preferred embodiment, metadata includes time references with relation to an identified frame of reference. For example, the metadata may provide that the initial 2 minutes 23 seconds from the frame of reference are played and then the next 58 seconds are skipped. The metadata may then indicate, for example, that other data is then inserted with certain other information overlayed for the next 30 seconds, and so on.

Figure 2:
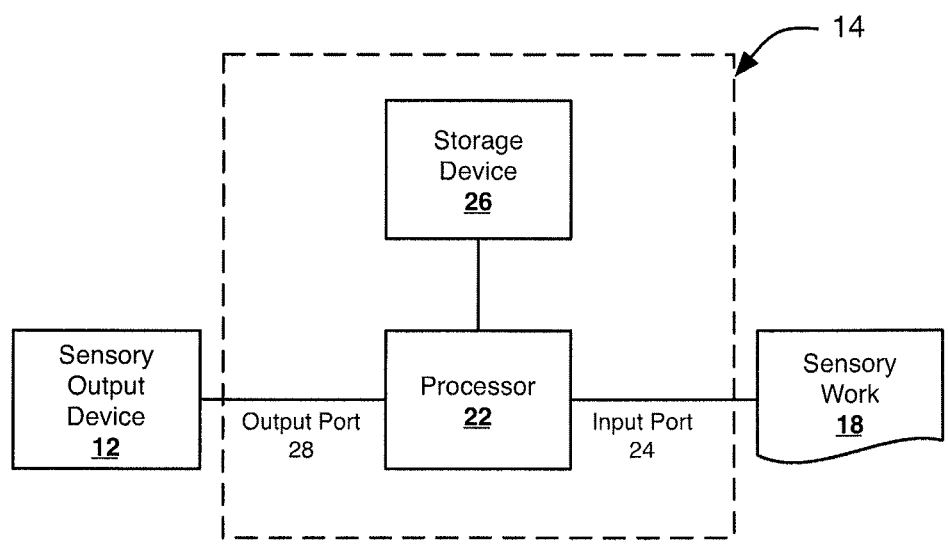
FIG. 2 is a diagram of a sensory work playback device.

Referring to FIG. 2, a sensory playback device 14 includes a processor 22 having a sensory work input port 24 operable to receive a sensory work 18, a storage device 26 for storing a playback control record 20, and a sensory work output port 28 operable to send information to a sensory output device 12 to enable the playback of a sensory work 18. As used herein, "port" is meant to include any device or mechanism by which the sensory playback device 14 may input or output data.

Figure 3:
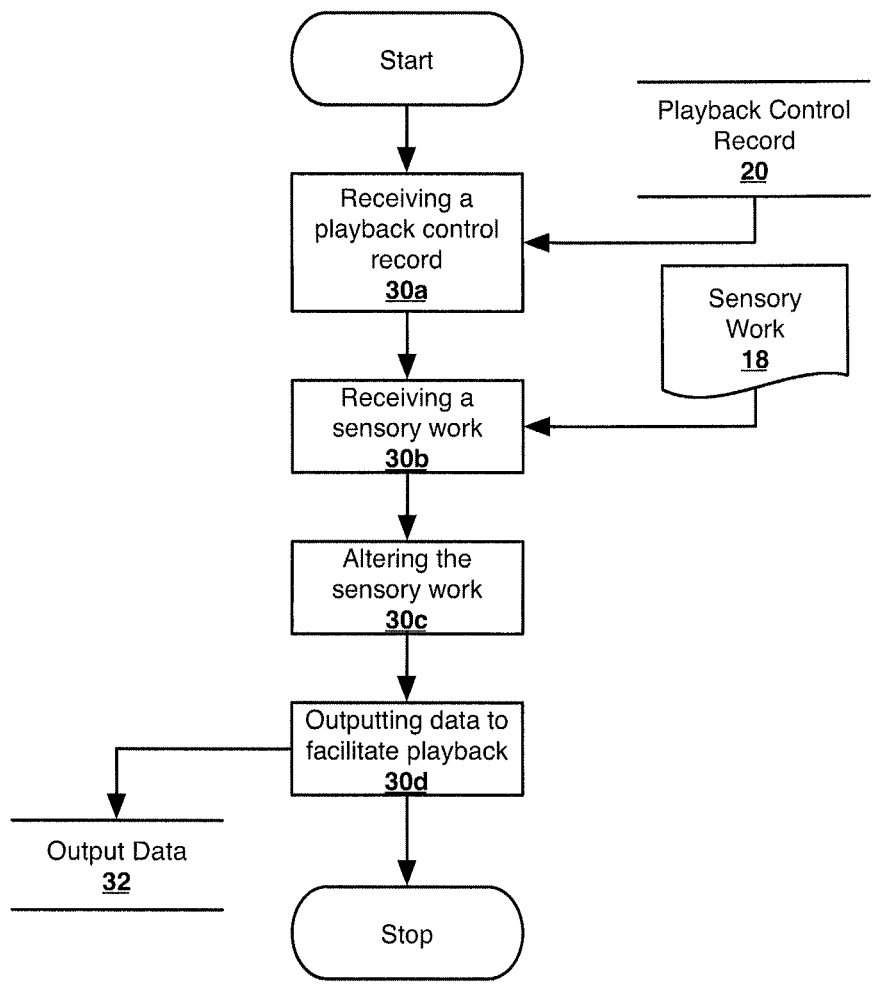
FIG. 3 is a flow chart of method for altering the playback of a sensory work.

Referring to FIG. 3, a method for altering the playback of a sensory work includes receiving a playback control record 20 (step 30a), receiving a sensory work 18 (step 30b), altering the sensory work 18 based on the playback control record 20 (step 30c), and outputting data 32 to facilitate altered playback of the sensory work 18 (step 30d).

Overlays

An overlay is a variation of a sensory work whereby data from at least one source is added to or otherwise combined with a sensory work to vary the playback of that sensory work. Overlays may include, by way of example and not by way of limitation, the following: captioning or other textual overlays; logos; watermarks; custom screen tickers; subtitles; advertising; and the like. The source of the overlay data may be one or more sensory works, or it may be otherwise defined. For example, a playback control record 20 may include information that defines an overlay without including an image, a video segment, an audio segment, or other sensory work. When the source of the overlay data is not itself sensory work, the overlay data may be used to generate an intermediate sensory work. This intermediate sensory work is then overlaid as defined by the playback control record 20. Alternatively, the overlay may be directly applied according to the playback control record 20 without creating an intermediate sensory work. By way of example, and not by way of limitation, text can be added to a sensory work as an overlay by generating an image corresponding to the text, and then applying that image to the sensory work. Alternatively, the sensory work can be modified during playback to directly apply the defined overlay.

In some implementations, overlays include various characteristics that can be selected to vary the location, size, and appearance of the overlay. Furthermore, these characteristics may be static for the duration of the overlay, or the characteristics may be varied over the duration of the overlay. In this manner, an overlay may, for example, be moved across the screen, zoomed, faded, rotated, and the like.

Community

A plurality of users forms a "Community." Within the Community, the users have access to the sensory work 18, such as, for example, an audio recording, a movie, television show, a work with tactile elements, light show, and the like. The sensory work may be of any form and from virtually any source. In addition, a user can have access to the metadata created by another user within the community.

More particularly, and by way of example and not by way of limitation, users within the Community have access to a sensory work. For example, users may have access to the most recent Super Bowl game footage. This game footage may be provided for access such that each user has the same sensory work or a copy of the same sensory work, or users may obtain the sensory work through other means (e.g., from broadcast television, cable, Internet, or satellite). Users within the Community can create metadata to vary the playback of the game, for example, a user may create a Cliff note version of the recent Super Bowl game footage to tailor such footage to their needs and/or desires. For example, one user may tailor the footage so that only the "snaps" for the entire game are included within the Cliff note version. In this way, the user can view the entire series of plays within the game without all the extraneous material unrelated to such plays. Thereafter, other users can access this version or Cliff note of the media and amend it to their needs or desires. For example, another user may use this version relating to all snaps within the game, but also add in the half-time show. In this way, users within the Community can collaborate with one another, express their opinions, or merely enjoy the creations of others on related themes. The community further provides for users to vote on various Cliff note versions, to interact with other members of the Community, and to express their interest and preferences. Such interests and preferences may be tracked and used to provide "user-specific" information to the Community or particular users within the Community. Finally, the summary nature of the Cliff note version allows users to view lengthy amounts of data within a short time period, if desired.

In another embodiment, the Cliff note versions may be supplemented with additional material from third parties relating to the Cliff note version. For example, advertisers may be able to insert advertisements within the Cliff note version that are tailored to the needs and/or desires of the user creating or modifying the Cliff note version.

In practice, each user within the Community will have access to a segment of media or data. This data or media can be sourced from TIVO, television, the Internet, or any other source. Thereafter, the system will normalize the segments of the users to determine a common starting point for all the segments provided amongst the users. This step is required since it is difficult to know where each user's segment begins due to the multiple sources of data. Once such starting point is determined for all users, reference points contained within the data or media may then be used to provide the beginning and end points for the Cliff note version of the data/media. Rather than send the entire media file, in a preferred embodiment, only the reference points are shared amongst the users within the community. This provides for accurate editing capabilities, enhanced transfer speeds and minimizes bandwidth issues. Further, the use of reference points makes insertion of data from third parties easier.

Normalization of a sensory work may be performed in various ways. For example, in some implementations, the first metadata reference point includes a fingerprint for a reference frame. This fingerprint may be taken performing calculations based on a single frame or a segment of frames. Any technique may be used to generate the fingerprint such that a user or the user's system may determine the reference used to create the metadata.

Once a Community is established and users have the desired segment of data or media, a user interface allows one or more of the users to access their segment and to create a Cliff note version of the data. The first time the specific data or media is accessed, the user is asked whether they wish to create a Cliff note version. Once a first version of the Cliff note is created, the reference points for such Cliff note version may be stored in a database and accessed by other users within the Community. The other users may access the Cliff note version, view it, modify it, add or delete data to it, and the like. Further, the community can vote on the best version, discuss the various versions, and the like. Awards or prizes may be associated with the versions and provided and determined by third parties and/or members within the Community.

Such a system, as described above, provides an enhanced and creative environment for users to join together with common interests and to individually or jointly develop creative works or summaries of data or media common to or associated amongst all the users. This provides not only excitement and amusement, but also a forum to express ideas and interest. Such an environment further provides for a means to track user interest and preferences so that the Community and/or third parties can track and provide information that is tailored to the users and the Community within the data and media.

In one implementation, a collaborative community facilitates the creation, sharing, and use of metadata to control or vary the playback of a sensory work. In this particular example, the community is supported by the insertion of profile-based advertising during the playback of the sensory data.

The system provides a mechanism to assist users in identifying the "best" contributed metadata for their purposes. For example, one mechanism that may be used is to allow users to rate metadata contributions.

Some implementations enable profile-based advertisement swaps such that targeted advertisements may be inserted during playback of sensory data. To determine which advertisement to insert, the system may use any available information, such as, for example, user preferences, account data, census data, demographics, user ratings, past participation in the community, and the like.

IR Blaster Embodiment

The techniques described above may be incorporated in a wide-variety of consumer electronics products including electronic music players (e.g., MP3 players, iPods, and the like, DVRs, personal computers, and the like). However, these techniques may also be used with legacy consumer electronics equipment.

Consider, for example, a consumer electronics control device operable to control or vary the playback of a consumer electronics playback device. For example, the control device may include an IR blaster, serial connection, network connection, and the like, operable to control a VCR, DVR, DVD player, or any other consumer electronic playback device. In the IR blaster implementation, the consumer electronics control device is operable to read metadata related to the playback of a particular sensory work 18 and to vary or control the playback through a consumer electronics playback device by sending signals using the IR blaster.

For example, metadata associated with Super Bow XL may identify a frame of reference and state to skip the 56 second segment beginning 7 minutes 15 seconds from the frame of reference. To do this, the consumer electronics control device can initiate a fast-forward operation at the 7 minutes 15 seconds point until the 56 second segment is complete.

In some implementations, the IR blaster may be able to simply request a 56 second skip; however, for some devices (such as VCRs) the consumer electronics control device may need information regarding the speed with which the consumer electronics playback device fast forwards.

Some implementations maintain a table storing the fast-forward and rewind-rates of various playback devices, along with latency times so that the consumer electronics control device can accurately perform variations and controls functions specified by the metadata.

Digital Video Recorder Embodiment

Figure 4:
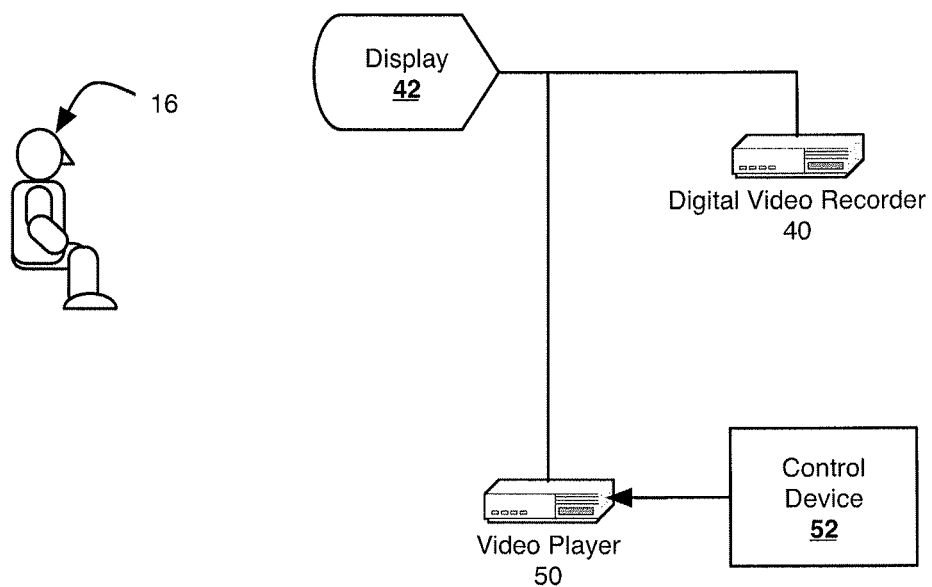
FIG. 4 is a diagram of a digital video recorder implementation and a legacy video player implementation of a sensory work playback system.

FIG. 4 is a diagram of implementations of sensory work playback systems 10 for varying and/or controlling the playback of video recordings for viewing by a stimulatory experient 16. In one implementation, a digital video recorder 40 is coupled to a display 42. The digital video recorder 40 is operable to perform operations such as those performed by conventional digital video recorders; however, the digital video recorder 40 is augmented support the variation and control of playback.

In some implementations, the digital video recorder 40 is operable to receive a playback control record 20 from an external source, such as, across a data network, from computer-readable media, or by user input. A playback record may be stored in a memory on the digital video recorder 40 and enabled to alter playback. For example, a stimulatory experient 16 who has recorded a television broadcast program may download a playback control record 20 associated with that television broadcast program such that he or she may view the program, skipping over commercials (e.g., by fast forwarding through them, by jumping over them, or the like).

Some consumers do not have digital video recorders 40 that can be updated to support the concepts disclosed herein because they are using legacy hardware that is not upgradeable. For those consumers, such as owners of conventional video cassette recorders, their legacy video player 50 may be used with a control device 52. The control device 52 may use a variety of techniques to control the video player 50, such as, for example, the IR blaster techniques discussed above. For these consumers, the control device 52 may be unable to determine information regarding the video being played. In such case, the control device 52 may rely on a stimulatory experient 16 to identify an appropriate playback control record 20 and to synchronize the execution of the playback control record 20 with video playback. For example, in some implementations, the control device 52 is configured to control a program loaded into video player 50. The stimulatory experient 16 operates the video player 50 to begin play and then initiates control by the control device 52.

The control device 52 may include a user interface to enable tracking relative to the current playback. For example, if the control device 52 signals the video player 50 to fast-forward through a commercial or a program segment too early, then the stimulatory experient 16 may use the interface relatively slow or speed control in order to synchronize the devices.

Figure 5:
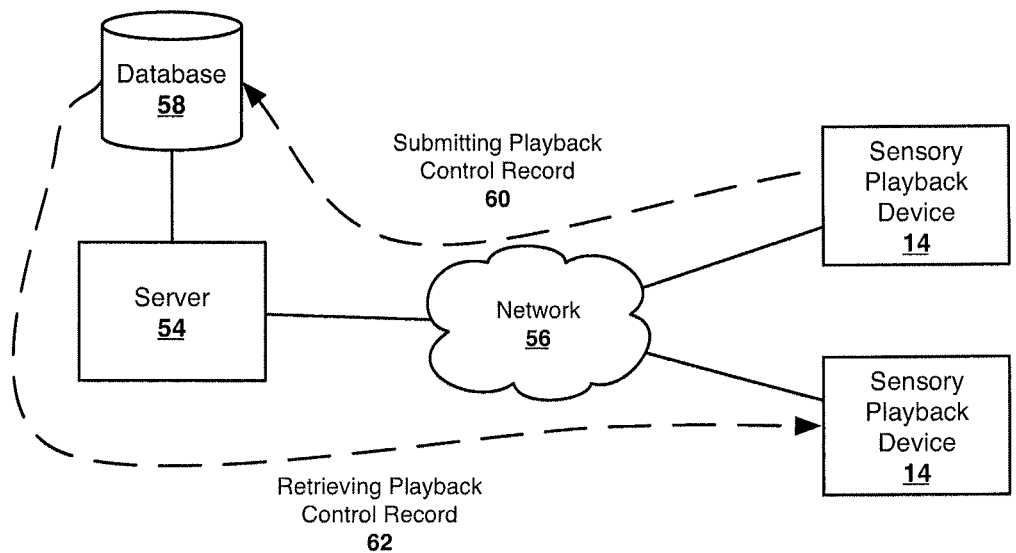
FIG. 5 is a diagram of a collaborative sensory work playback system.

Referring to FIG. 5, a collaborative sensory work playback system includes a server 54 coupled to a network 56, such as, for example, the Internet, a wide area network, a local area network, or the like. The server 54 operates in conjunction with a database 58 to enable the exchange of playback control records 20. Any database or data storage techniques may be used such that one or more sensory playback devices 14 may interact with the server 54 to submit playback control records 60 or retrieve playback control records 62.

This implementation of a collaborative sensory work playback system may be used, for example, to enable an online community for sharing playback control records 20. Any of the techniques described above may be used in this system. For example, a user in one household having a DVR sensory playback device 14 may record a television program on the DVR and create a playback control record 20 that varies the playback of a recorded sensory work, and submit the playback control record 60 the server 54. The playback control record 20 is stored in database 58. Another user, such as, for example, a user in another household, may be use an enabled DVR sensory playback device 14 and search, using server 54, to find any playback control records 20 applicable to a particular sensory work 18 available to the user. This user may choose to retrieve the playback control record 62 created and submitted by the first user and use it to vary the playback of the same sensory work 18 recorded on his or her DVR.

Network Media Players

Figure 6:
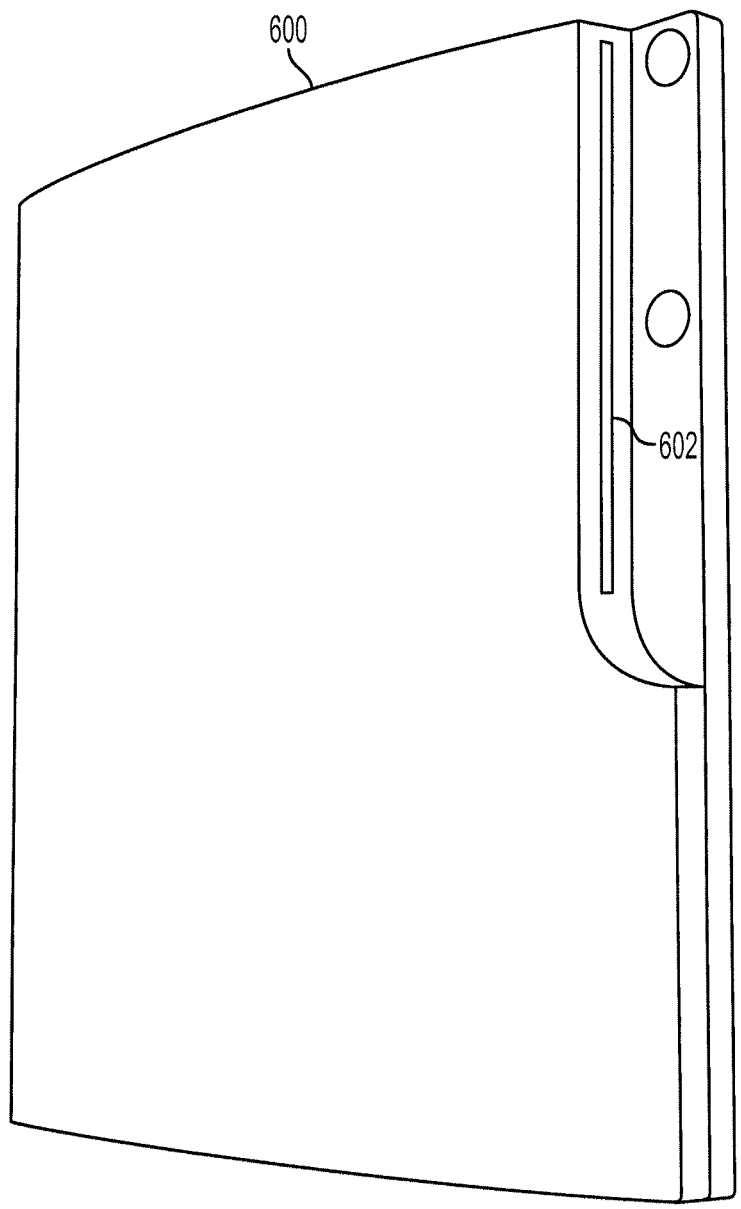
FIG. 6 depicts a network media player.

The techniques described above may be embodied in network media players. Referring to FIG. 6, a network media player 600 provides a sensory work playback system that is network-enabled, providing one or more interfaces to a data network. The network media player 600 includes one or more data networking interfaces, such as, for example, a wireless and/or wired data networking interface, to enable the media player to receive one or more sensory works 18. These sensory works 18 may be stored locally for later playback, or may be streamed.

Some implementations of the network media player 600 include a media reader 602, such as, for example, a Blu-ray Disc drive, a CD drive, a DVD drive, and the like. The media reader 602 may support in addition to or alternatively to the above disc media, any other media including, by way of example and not by limitation, flash memory (e.g., Memory Stick flash memory cards, CompactFlash, SmartMedia, PC Card, SD cards, MMC cards, and the like), hard disk drives, and the like. Further, the media reader 601 may be implemented as a data port, such as, by way of example and not by way of limitation, a USB port, a FireWire port, a serial port, and the like. Using a data port, the network media player 600 may access media stored on a connected device, such as, for example, a digital camera, a video camera, a computer, a mobile electronic device, and the like.

Figure 7:
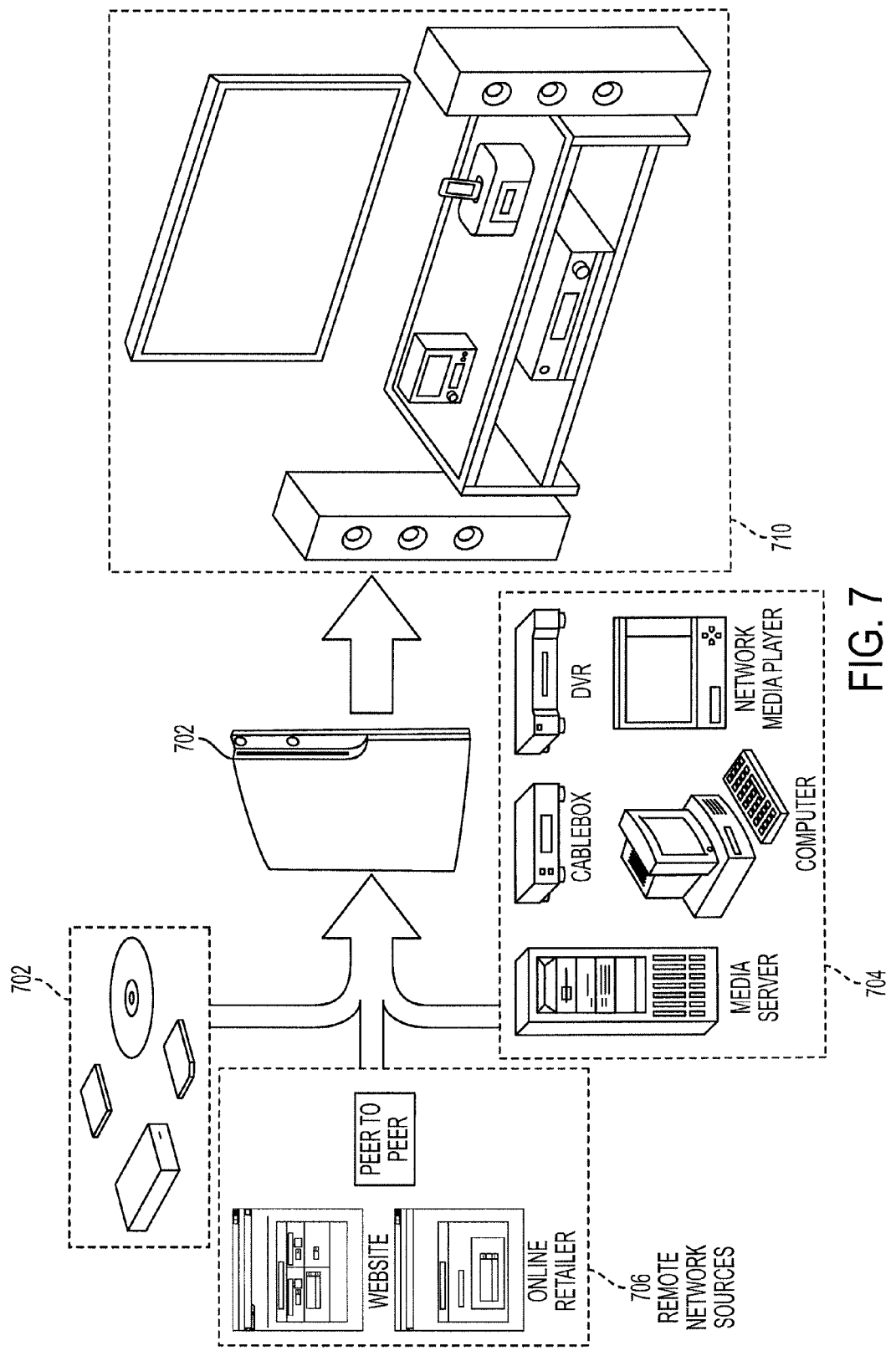
FIG. 7 illustrates a network media player that enables the playback control of input content received from various sources.

Referring to FIG. 7, the network media player 600 receives a sensory work 18 for playback from any source including, by way of example and not by way of limitation, from local media 702 using the media reader 602 or other interface device, from remote network sources 606, and from local network sources 704. The network media player 600 may receive a sensory work 18 from local media through the media reader 602 as described above. Furthermore, the network media player 600 may be configured to receive sensory works 18 across a network (either local or remote). Local network sources 704 include, by way of example and not by way of limitation, media servers, cable set-top boxes, personal computers, DVRs, other network media players, and the like. Remote network sources 706 include, by way of example and not by way of limitation, websites, online retailers, peer-to-peer networks, and the like.

Academy Awards: Playback of Select Segments

Figure 8:
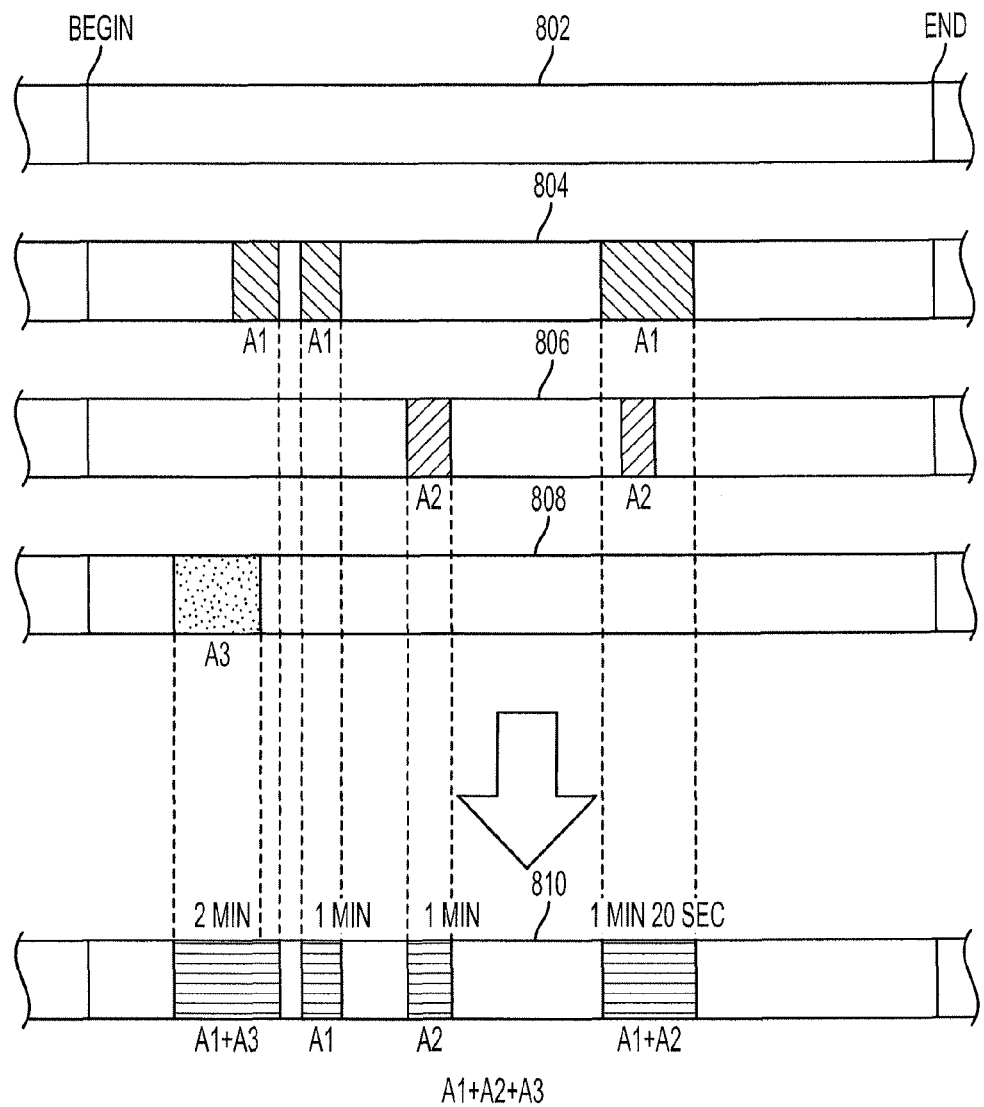
FIGS. 8 and 9 are diagrams of single-source playback control in a network media player.

Referring to FIG. 8, the network media player 600 permits a user to create a playback control record 20 to vary and control playback using the techniques described herein above. For example, a user can create a custom viewing experience that varies playback as defined by a playback control record 20 using the network media player 600 (or other device). Consider for example, a user that wishes to modify playback of his or her recording of the Academy Awards 802. The Academy Awards 802 can be recorded locally by the network media player 600, or it may be received from another source as discussed above. By way of example, the Academy Awards 802 may be retrieved from a DVR accessible across a local area network, and/or it may be purchased and downloaded from a website. Actors may appear during portions of the Academy Awards 802, for example, as award recipients, as award presenters, as performers, as audience members, and the like. In this system, a user may create a playback control record 20 to show only those portions of the Academy Awards 802 where a particular actor appears.

For example, a user may wish to view those portions of the Academy Awards 802 where three actors appear: (i) Sean Penn (A1); (ii) Angelina Jolie (A2); and (iii) Kate Winslet (A3). In FIG. 8, those segments of the Academy Awards 802 where Sean Penn appears are depicted in 804, those segments of the Academy Awards 802 where Angelina Jolie appears are depicted in 806, and those segments of the Academy Awards 802 where Kate Winslet appears are depicted in 808. Identified segments of the Academy Awards 802 can be combined as shown in 810 to include only those portions where those actors appear.

Figure 9:
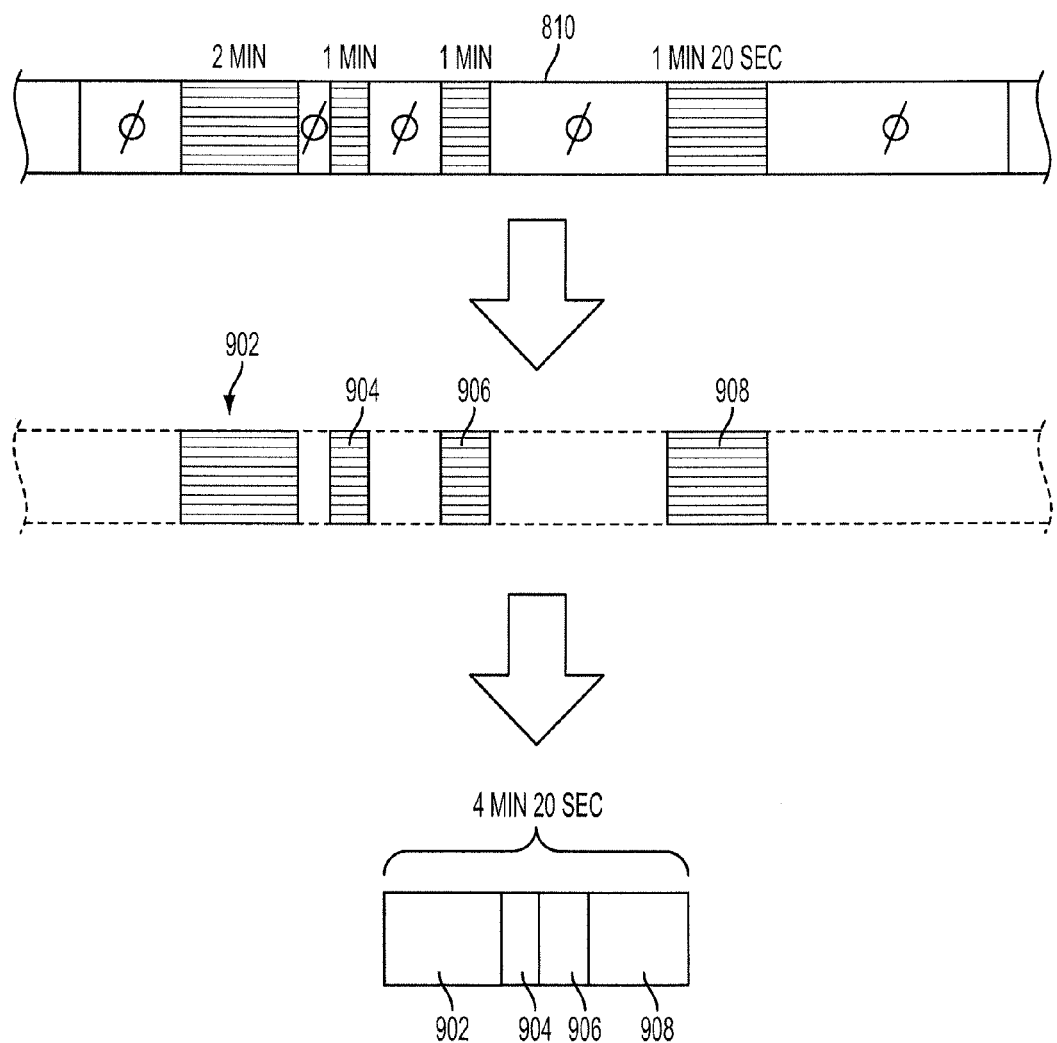

Referring to FIG. 9, four segments (902, 904, 906, and 908) of the Academy Awards make up the combined portions where Sean Penn, Angelina Jolie, and Kate Winslet appear. Segment 902 is 2 minutes in length, segment 904 is 1 minute in length, segment 906 is 1 minute in length, and segment 908 is 1 minute 20 seconds in length. During playback, these segments (902, 904, 906, and 908) are played consecutively such that the total playback time is 4 minutes 20 seconds (i.e., 2+1+1+1:20). A playback control record 20 is created to provide information that may be used to control playback in this manner.

Figure 10:
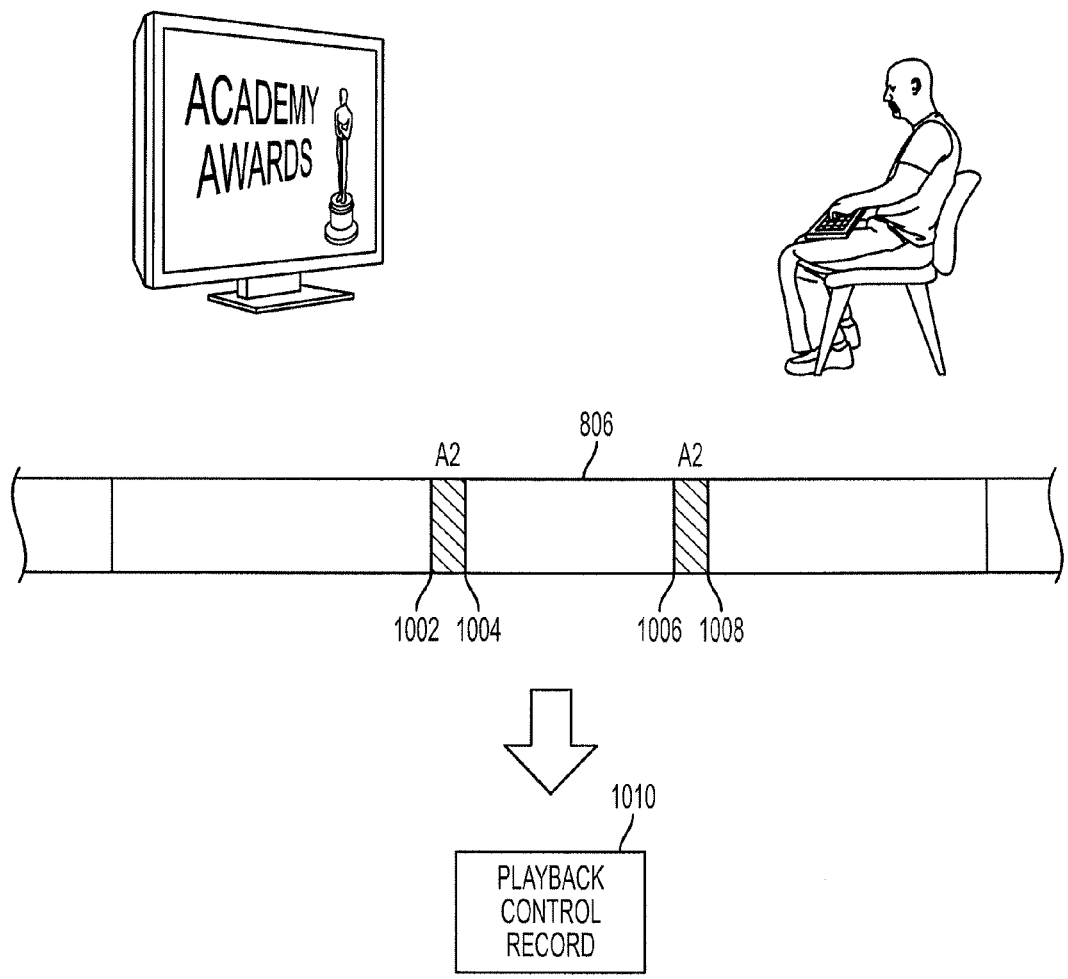
FIG. 10 illustrates the creation of a playback control record.

Referring to FIG. 10, a user can create a playback control record 1010 defining those segments where Angelina Jolie appears (marked A2). For example, in one implementation, the user presses a button to identify the beginning of a segment, and the user presses a button to identify the end of a segment. In this case, the user presses the appropriate buttons at 1002, 1004, 1006, and 1008 to identify the relevant begin and end portions of the segment. In some implementations, the system adjusts the beginning and end points to better capture the user's intention. For example, if a user sees Angelina Jolie appear on the screen, and presses the button to identify the beginning of an included segment, then there would be some lag time between when the user decided to include a segment, and when the button was actually pressed. Thus, it may be desirable for the actual beginning to be slightly before the button was pressed. Likewise, it may be desirable to slightly adjust the end point to capture the user's intention.

Start points and end points may be adjusted in various ways. For example, the points can be adjusted a predetermined period of time (e.g., 2 seconds, 1 second, 500 milliseconds, or any other period of time). Furthermore, it may be possible to determine the user's intention based on characteristics of the program itself. For example, the system may identify commercial breaks and set the start point or end point based on an identified commercial break if the commercial break falls near that point. Other points may be determined by identifying characteristics within the sensory work (e.g., black screen, silence, music, voices, and the like), or by using metadata associated with the work. For example, the Academy Awards 802 may be augmented with metadata (either stored within the work or stored separately) that tags those portions of the video. Tags may include, by way of example and not by way of limitation, identification of actors, scenes, music, commercials, and the like.

Playback Control: Overlays

Figure 11:
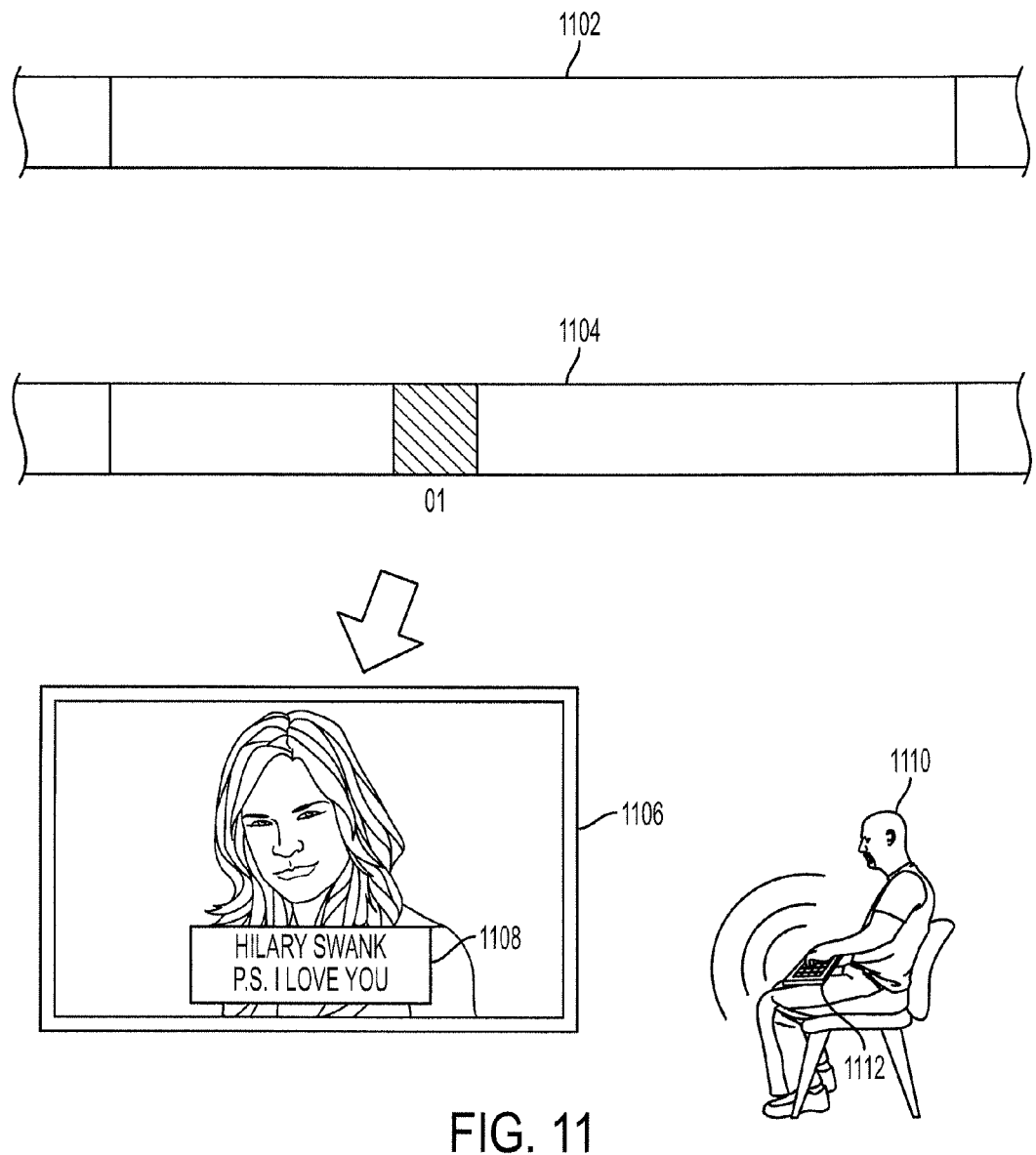
FIG. 11 depicts text overlay in a network media player.

As discussed herein above, playback control records 20 may be used to vary playback in many different ways. For example, a user may create a playback control record 20 to include a video overlay during playback of a program. Referring to FIG. 11, a sensory work 1102 includes a segment relating to Hilary Swank's movie "P.S. I Love You." In this example, a user 1110 desires to create an overlay for a portion of the work 1102 such that the network media player 600 displays "Hilary Swank: P.S. I Love You" during a corresponding interview segment of the sensory work 1102. To do this, the user 1110 creates a playback control record 20 that defines an overlay segment (O1). The combination of the sensory work 1102 and the overlay segment (O1) are shown in FIG. 11 as 1104. During playback of the segment O1 on a television 1106, the network media player 600 adds the overlay 1108. A user can create the overlay by identifying a start point and an end point, along with the text, video, and/or audio to be overlayed on sensory work 1102. FIG. 11 depicts a user 1110 typing text for an overlay using a keyboard 1112.

In some implementations, it may be desirable to enable the user to control various characteristic of the overlay. For example, a user may be given the option to vary the opacity, the color, the font, the background, and the like for the overlay. Furthermore, a user may be given the option to vary the location, shape, size, and position of the overlay. This could allow a user, for example, to include a cartoon-like caption. Analogous controls also may be provided for audio overlays.

Furthermore, overlays may be user-generated or network-generated. User-generated overlays can be used to create custom playback of content. For example, a user could overlay a frame image, add a ticket bar, place a logo in the corner of the screen, add a sound track, or perform any other overlay function. This can also be done using a network overlay system.

Network-Generated Overlay

Network-generated overlays are instructions provided by a broadcaster, cable provider, or other content provider to vary content playback. Overlays can be defined and transmitted separately from the associated content or embedded within such content. For example, a content provider can distribute content to many different recipients for redistribution to end consumers, with differing overlays provided to those recipients. In this manner, logos, tickers, and other overlays can be customized for a particular recipient or set of recipients. Such content variation can be performed in a manner that is transparent to end consumers.

Network-generated overlays can be applied by local redistributors, such as, for example, a cable company, radio station, online media provider, or other content provider. In addition, or alternatively, overlays can be applied by the end consumers' media players.

Playback Control: Multiple Sources

Figure 12:
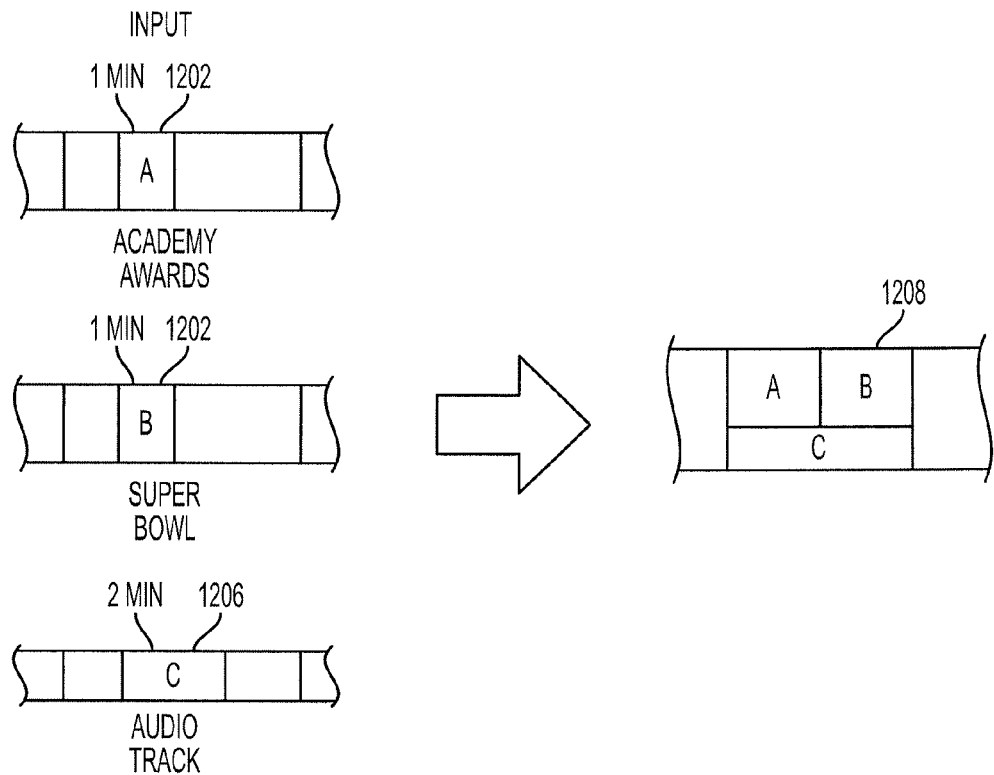
FIG. 12 is a diagram of multiple-source playback control in a network media player.

Referring to FIG. 12, playback control is not limited to varying the playback of a single source. Using the network media player 600, it is possible to combine segments from multiple sources, and perform any other variation technique described herein above, including deletion, reordering, overlaying, playback speed variation, insertion, alteration of presentation, and the like, to combine those sources for playback. For example, FIG. 12 illustrates the combination of three sensory works 18: (i) the Academy Awards; (ii) the Super Bowl; and an audio track. Portions of these sensory works 18 may be combined according to one or more playback control records 20. For example, a playback control record 20 may be created to control the playback of a segment 1202 (marked A) of the Academy Awards, followed by a segment 1204 (marked B) of the Super Bowl. Each of these segments (1202 and 1204) is one minute in length for a combined total of two minutes. These segments (1202 and 1204) are further combined with a two-minute segment 1206 (marked C) of the audio track resulting in combined segment labeled 1208.

Figure 13:
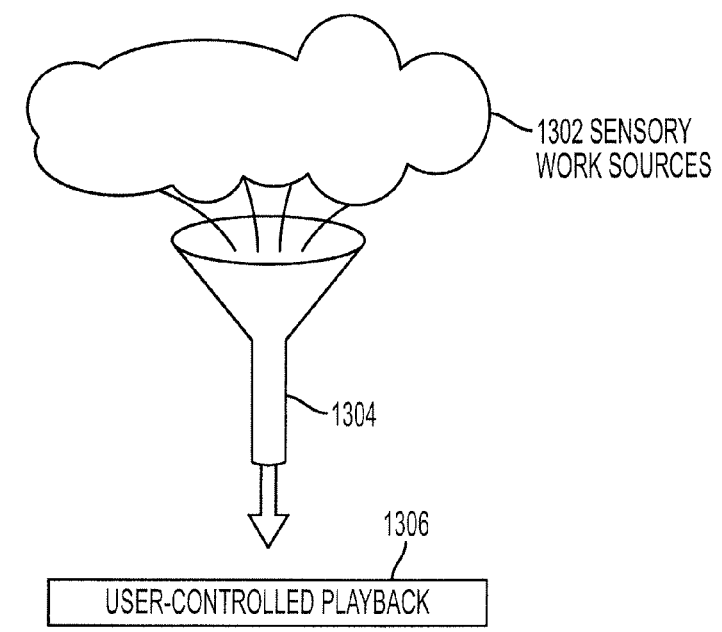
FIG. 13 depicts playback control in a network media player.

Referring to FIG. 13, this technique may be generalized to permit the combination of any number of sensory works to create user-controlled playback on a network medial player 600. Data from one or more sensory work sources 1302 are combined as defined by one or more playback control records 1304 to produce the resulting user-controlled playback 1306.

In FIG. 13, the one or more playback control records 1304 are depicted as a funnel to illustrate that any number of sensory works 18 from any source may be combined, altered, augmented, or varied in any manner, including all those techniques described herein, to produce user-defined playback, opening the door to endless possibilities of new applications.

Social Networking Embodiment

Using the community features described herein above, playback control records 20 may be shared in a social networking system. In one implementation, members of a social networking website contribute playback control records 20, which can in turn be used by other members. For example, members of a social network can generate playback control records 20 to control the playback of the Academy Awards, as discussed above. Consider, for instance, three members of the social network, Amy, Bob, and Charlie, each recording the Academy Awards show using their own DVR. Referring to FIG. 8, Amy creates and contributes a playback control record 20 to show only those segments (A1) of the Academy Awards where Sean Penn appears, as shown in 804. Similarly, Bob contributes a playback control record 20 (corresponding to 806) showing those segments (A2) of the Academy Awards where Angelina Jolie appears, and Charlie contributes a playback control record 20 (corresponding to 808) showing those segments (A3) of the Academy Awards where Kate Winslet appears. These playback control records may be downloaded and used by the other members.

Contribution of Playback Control Records

Playback control records 20 may be created and captured using any of the techniques described herein above. For example, a playback control record 20 may be created by a user using a network media player 600, a DVR, a personal computer, a set-top box, a Blu-ray Disc player, a portable media player, or any other device. These playback control records 20 are typically shared separately and distinctly from the associated content. For example, the playback control records 20 contributed by Amy, Bob, and Charlie are used without uploading the Academy Award content. Instead, each member obtains access to the associated content by recording, purchasing, or otherwise obtaining such content. However, in some implementations, the playback control record 20 is distributed together with the associated content, or attached to or embedded within the associated content.

In this implementation, playback control records 20 are uploaded to the social network system and made available for use by others.

Playback Control Record Popularity

Figures 14, 15:
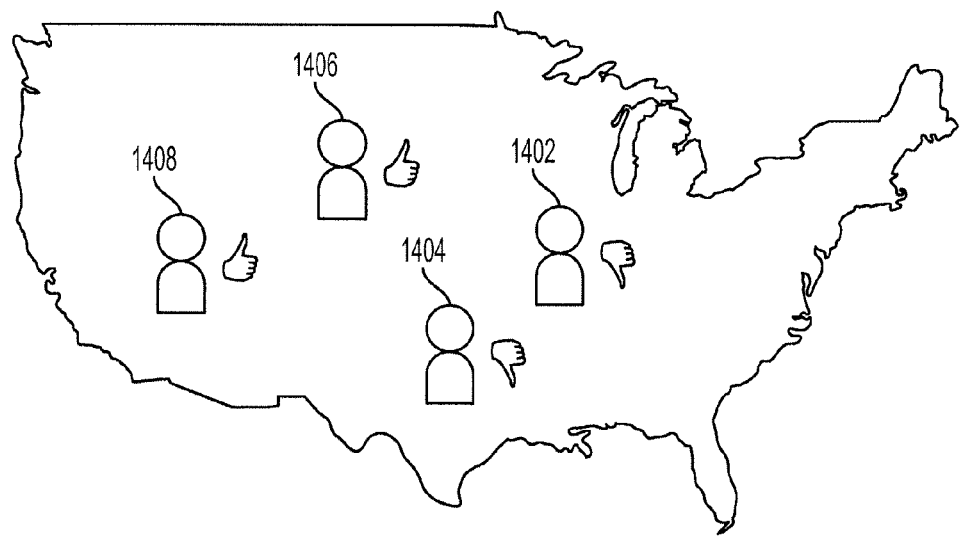
FIG. 14 is a diagram of member's voting in a social-driver media player system.
FIG. 15 is a screenshot showing available playback controls and associated popularity in a social-driver media player system.

Referring to FIG. 14, the social network system assists members in identifying playback control records 20 that may be appealing by enabling members to express opinions regarding available playback control records 20. For example, in FIG. 14, two members (1402 and 1404) vote "thumbs down" on a particular playback control record, and two members (1406 and 1408) vote thumbs up. This allows members to identify the most popular playback control records 20. For example, FIG. 15 shows available playback controls sorted by popularity.

As an alternative to, or in addition to the "thumbs up/thumbs down" rating system, the social network can use any other technique now known or later developed for capturing and sharing user rankings and preferences. For example, a social network system can use a rating system like that used by Netflix. In such a system, playback control records 20 would be ranked by members on a scale (e.g., from 1 to 5). Not only does the system allow members to view average ratings of a particular playback control record 20, but it also allows members to view those playback control records 20 enjoyed by members who enjoyed that particular playback control record 20.

Obtaining a Playback Control Record

In the social network system, playback control records 20 are stored without the associated content. Accordingly, a user that has not purchase or otherwise obtained the content associated with a playback control record 20 cannot use that playback control record 20. Accordingly, the social network system can be configured to give members the option to only display those playback control record 20 usable by that member. For example, a member that did not record the Academy Awards, would not be able to use the playback control records 20 uploaded by Amy, Bob, and Charlie.

In some implementations, content may be available for download, either through the social network system, or through another site. Such content may be made available for download with or without charge. Members may be given several options when viewing available playback control records 20, including: (i) display all playback control records; (ii) display only playback control records associated with my content; (iii) display only playback control records associated with downloadable content. Furthermore, members can choose whether or not to include content that is provided for a fee.

As discussed herein above, the playback control records 20 identify the associated content using some form of unique identifier. In this system, the social network system maintains a list of the content that is currently available to a member. For example, when a member records a program on a DVR, that information is used by the social network system to make associated playback control records 20 available to that user. In addition, content purchased by a member in other formats (including Blu-ray Discs, DVDs, and the like) may be included in such list. In one embodiment, Blu-ray Disc players, network media players, and other playback devices are configured to as to identify new content in such a way that it may be used by the social network system. For example, when a member plays a new Blu-ray Disc, the movie would be registered by the Blu-ray Disc player as content available to that member. To protect the privacy of members, the list of available content may be stored locally and used only to filter the results received from the social network website. Thus, no data regarding a member's available content is transmitted or otherwise shared.

Modification of Playback Control Records

In addition to creating and sharing original playback control records, a member can also modify existing playback control records. Once retrieved, a playback control record 20 can be edited, or combined with other playback control records. For example, a member can download Amy's and Bob's Academy Awards playback control records to create a new record to playback those segments where either Sean Penn or Angelina Jolie appears.

Use of Playback Control Records

Figure 16:
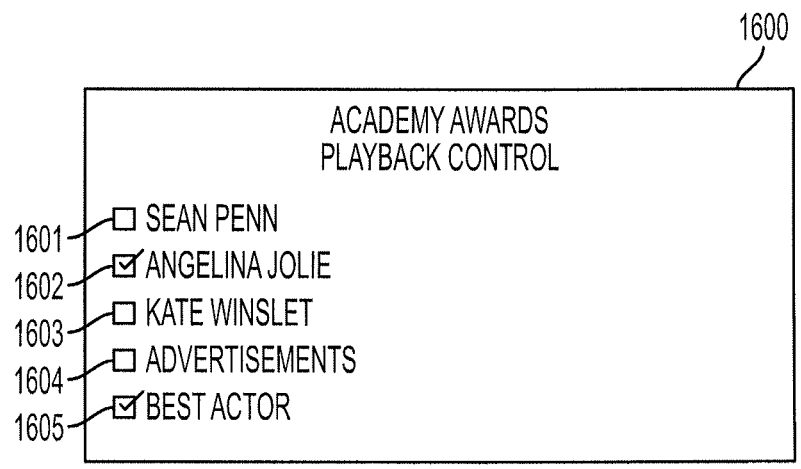
FIG. 16 is a media player playback control selection screen.

Playback control records 20 retrieved from the social network system may be used in any manner described herein. In addition to selecting a single playback control record, some implementations permit the selection of multiple playback control records. Referring to FIG. 16, a user selecting to view the Academy Awards is presented with a screen 1600 identifying the available playback control records (1601, 1602, 1603, 1604, 1605). Any of these playback control records can be selected and combined for playback. Selected playback control records are indicated by a checkmark.

Some implementations provide additional control over how playback control records are combined. For example, selected playback control records may be combined using Boolean logic operators AND, OR, NAND, NOR, XOR, NOT, and the like. This would enable, by way of example and not by way of limitation, a user to select to include those segments of the Academy Awards where Angelina Jolie appears, except during advertisements (i.e., 1602 AND NOT 1604). In this manner, members are enabled to greatly enrich their content viewing experience.

CONCLUSION

We are inundated with sensory works 18. Much effort has been put in to identifying, locating, and accessing particular sensory works 18 (e.g., PVRs, Internet search technology, and the like); however, few processes are available to help one better process a particular sensory work 18. The techniques and systems described above are widely applicable to any sensory work 18, allowing a user, a company, or a community to create, use, and/or share metadata varying and/or controlling the playback of a sensory work 18.

A number of implementations have been described. Nevertheless, it will be understood that various modifications may be made without departing from the spirit and scope of the invention. Accordingly, other implementations are within the scope of the following claims.

What is claimed is:

1. A method for user-generated content control in a network media system, the system including one or more data sources and a playback device, the method comprising:
    retrieving input content at the playback control device from the one or more sources;
    retrieving a playback control record at the playback device;
    generating, using a processor in the playback control device, under control of the information in the playback control record output content from the retrieved input content from the one or more sources according to the playback control record so as to vary the playback of the retrieved input content, wherein the processor generates the output content using information contained in the playback control record, wherein the information includes an applicability identifier usable to determine whether the playback control record is applicable to input content, a content variation descriptor that defines an alteration to be applied to the retrieved input content, and latency times of various playback devices that are not pre-assigned to the media player or any of the one or more sources; and
    outputting, using the processor, the generated output content.

2. The method of claim 1, wherein retrieving input content from one or more sources includes retrieving content from a local source.

3. The method of claim 2, wherein the local source includes one or more from the group consisting of:
    a computer;
    a digital video recorder;
    a set-top box;
    a network media player; and
    a network media server.

4. The method of claim 2, wherein retrieving content from the local source includes reading data from a data storage device.

5. The method of claim 1, wherein retrieving input content from one or more sources includes retrieving content from a remote source.

6. The method of claim 5, wherein the remote source is a server accessible from the Internet.

7. The method of claim 1, wherein the content is a sensory work.

8. The method of claim 1, further comprising receiving a playback control record.

9. A network media player having access to one or more data sources, comprising:
    a content input port;
    an output port; and
    a processor configured to retrieve input content from the one or more sources and a playback control record using the content input port, to generate output content from the retrieved input content according to the playback control record so as to vary the playback of the retrieved input content, and to output the generated output content to the output port, wherein the processor generates the output content under control of information contained in the playback control record, wherein the information includes an applicability identifier usable to determine whether the playback control record is applicable to input content, a content variation descriptor that defines an alteration to be applied to the retrieved input content, and latency times of various playback devices that are not pre-assigned to the media player or any of the one or more sources.

10. The network media player of claim 9, wherein the content input port receives at least one sensory work.

11. The network media player of claim 9, wherein the content input port is a removal media drive.

* * * * *

UNITED STATES PATENT AND TRADEMARK OFFICE
CERTIFICATE OF CORRECTION

PATENT NO. : 8,644,677 B2  Page 1 of 1
APPLICATION NO. : 12/631108
DATED : February 4, 2014
INVENTOR(S) : Gary Zalewski It is certified that error appears in the above-identified patent and that said Letters Patent is hereby corrected as shown below:

In the Specification:

Column 1, In line 56, insert --.-- after "like"

Column 14, In line 12, add --s-- to "characteristic"

Column 16, In line 7, add --d-- to "purchase"

Column 16, In line 11, add --s-- to "record"

Signed and Sealed this
Sixth Day of May, 2014

Michelle K. Lee
*Deputy Director of the United States Patent and Trademark Office*